(12) United States Patent
Stadelbacher

(10) Patent No.: US 10,525,823 B2
(45) Date of Patent: Jan. 7, 2020

(54) INLET END PIECE FOR THE TANK INLET OF A MOTOR VEHICLE

(71) Applicant: Gerdes GmbH, Kerpen-Sindorf (DE)

(72) Inventor: Marc Stadelbacher, Burscheid (DE)

(73) Assignee: Gerdes GMBH, Kerpen-Sindorf (DE)

( * ) Notice: Subject to any disclaimer, the term of this patent is extended or adjusted under 35 U.S.C. 154(b) by 0 days.

(21) Appl. No.: 15/766,247

(22) PCT Filed: Oct. 6, 2016

(86) PCT No.: PCT/DE2016/100464
§ 371 (c)(1),
(2) Date: Apr. 5, 2018

(87) PCT Pub. No.: WO2017/059844
PCT Pub. Date: Apr. 13, 2017

(65) Prior Publication Data
US 2018/0281586 A1 Oct. 4, 2018

(30) Foreign Application Priority Data

Oct. 8, 2015 (DE) .................. 20 2015 105 342 U

(51) Int. Cl.
*B60K 15/04* (2006.01)
*B65B 1/04* (2006.01)

(52) U.S. Cl.
CPC ...... *B60K 15/04* (2013.01); *B60K 2015/0429* (2013.01); *B60K 2015/0461* (2013.01); *B60K 2015/0493* (2013.01)

(58) Field of Classification Search
CPC ............ A47G 29/121; B60K 2015/049; B60K 2015/0429; B60K 2015/0458; B60K 2015/0461; B60K 2015/0493; B60K 2015/0477; B60K 2015/0483; B60K 2015/0487; B60K 15/04; B60K 15/07;
(Continued)

(56) References Cited

U.S. PATENT DOCUMENTS 2,033,432 A * 3/1936 Leach .................... B60K 15/05
220/86.2
2,146,211 A * 2/1939 Hail ........................ G01F 23/58
116/228
(Continued)

FOREIGN PATENT DOCUMENTS

DE 102011111234 A1 2/2013
DE 102013201896 A1 8/2013
(Continued)

*Primary Examiner* — Gideon R Weinerth

(57) ABSTRACT

Disclosed is an inlet end piece for the tank inlet of a motor vehicle, having a closure insert arranged in an upper area of a pipe inlet, having a filling opening and a sealing flap which counter to the force of a closure spring by way of a gas pump nozzle is capable of being opened by pivoting, and is held in the closed state by the closure spring. The inlet end piece has an indicator means having an indicator area, wherein the indicator means in the case of a closed sealing flap is located in an inactive position in which an indicator area of the indicator means is not visible to the user, and in the case of the sealing flap being at least partially opened, the indicator means is displaced into a signal position in which the indicator area becomes visible.

12 Claims, 3 Drawing Sheets

(58) Field of Classification Search
CPC .......... B60K 2015/03328; B60K 15/00; B60K 15/01; B60K 15/03; B67D 7/32; B67D 7/3209; B67D 7/3245; B67D 7/42; F02M 37/0076; B29L 2031/7172; B60Y 2410/132
USPC .......... 222/23, 49; 220/86.2, 264, 284, 823; 119/14.17; 73/294; 141/311 R, 349, 350, 141/312, 348
See application file for complete search history.

(56) References Cited

U.S. PATENT DOCUMENTS

| | | | | |
|---|---|---|---|---|
| 2,247,509 A * | 7/1941 | Lebus | B60K 15/04 | 220/264 |
| 2,360,338 A * | 10/1944 | Hammand | G01F 23/04 | 116/109 |
| 2,441,872 A * | 5/1948 | Di Renzo | B60K 15/0406 | 116/109 |
| 2,524,313 A * | 10/1950 | Gerling | B60K 15/04 | 116/228 |
| 2,895,447 A * | 7/1959 | Burrell | G01F 23/58 | 116/228 |
| 3,580,414 A * | 5/1971 | Ginsburgh | B60K 15/04 | 220/86.2 |
| 3,958,633 A * | 5/1976 | Britch | E21B 23/03 | 166/117.5 |
| 4,195,673 A * | 4/1980 | Johnston | B67D 7/34 | 141/349 |
| 4,719,949 A * | 1/1988 | Mears | B60K 15/03504 | 137/587 |
| 4,809,865 A * | 3/1989 | Mori | B60K 15/03504 | 123/519 |
| 4,881,655 A * | 11/1989 | Jansky | B60K 15/04 | 220/203.18 |
| 4,941,587 A * | 7/1990 | Terada | B60K 15/04 | 220/746 |
| 4,966,299 A * | 10/1990 | Teets | B60K 15/04 | 123/516 |
| 5,485,871 A * | 1/1996 | Romanek | B60K 15/04 | 141/312 |
| 5,715,963 A * | 2/1998 | Boll | B60K 15/04 | 220/264 |
| 5,865,222 A * | 2/1999 | Diamond | B67D 7/3209 | 114/343 |
| 6,009,920 A * | 1/2000 | Palvoelgyi | B60K 15/03519 | 137/588 |
| 6,443,195 B2 * | 9/2002 | Palvoelgyi | B60K 15/04 | 141/301 |
| 6,957,703 B2 * | 10/2005 | Trott | E21B 34/10 | 166/332.8 |
| 6,983,773 B1 * | 1/2006 | Hagano | B60K 15/04 | 141/348 |
| 7,337,945 B1 * | 3/2008 | Riggs | A47G 29/121 | 232/35 |
| 7,461,673 B2 * | 12/2008 | Busch | B60K 15/0406 | 141/348 |
| 7,644,723 B2 * | 1/2010 | Zsigmond | F16K 21/185 | 137/172 |
| 8,678,049 B2 * | 3/2014 | Roys | B67D 7/344 | 141/1 |
| 9,469,520 B2 * | 10/2016 | Schulze | B67D 7/344 | |
| 10,000,117 B2 * | 6/2018 | Giles | B60K 15/04 | |
| 10,118,481 B1 * | 11/2018 | Burnett | B60K 15/04 | |
| 2002/0000260 A1 * | 1/2002 | Palvoelgyi | B60K 15/04 | 141/350 |
| 2005/0199315 A1 * | 9/2005 | Scharrer | B60K 15/0406 | 141/350 |
| 2005/0217751 A1 * | 10/2005 | Valentine | B60K 15/04 | 141/104 |
| 2005/0274784 A1 * | 12/2005 | Mullins | A47G 29/121 | 232/35 |
| 2006/0032552 A1 * | 2/2006 | Hedevang | B60K 15/04 | 141/367 |
| 2006/0260683 A1 * | 11/2006 | Zsigmond | F16K 21/185 | 137/172 |
| 2009/0188582 A1 * | 7/2009 | Hagano | B60K 15/04 | 141/349 |
| 2010/0012223 A1 * | 1/2010 | Yoshida | B60K 15/0406 | 141/350 |
| 2012/0217240 A1 * | 8/2012 | Dutzi | B60K 15/0406 | 220/86.2 |
| 2013/0228576 A1 * | 9/2013 | Gerdes | B60K 15/0406 | 220/86.2 |
| 2013/0327768 A1 * | 12/2013 | Kataoka | B60K 15/04 | 220/86.2 |
| 2014/0367390 A1 * | 12/2014 | Horlacher | B60K 15/04 | 220/562 |
| 2015/0291023 A1 * | 10/2015 | Bar | B60K 15/04 | 220/86.2 |
| 2016/0031317 A1 * | 2/2016 | Giles | B60K 15/04 | 220/86.2 |
| 2016/0059691 A1 * | 3/2016 | Saeki | B60K 15/0406 | 220/86.2 |
| 2016/0069492 A1 * | 3/2016 | Aso | B60K 15/04 | 251/68 |
| 2018/0105035 A1 * | 4/2018 | Radu | B60K 15/04 | |
| 2018/0170174 A1 * | 6/2018 | Wakao | B67D 7/3209 | |
| 2018/0229599 A1 * | 8/2018 | Suda | B60K 15/035 | |
| 2018/0244149 A1 * | 8/2018 | Fiore | B60K 15/04 | |
| 2018/0281586 A1 * | 10/2018 | Stadelbacher | B60K 15/04 | |

FOREIGN PATENT DOCUMENTS

| | | |
|---|---|---|
| DE | 202015105342 U1 | 12/2015 |
| JP | 08253039 A | 10/1996 |
| WO | 2012167062 A2 | 12/2012 |

* cited by examiner

INLET END PIECE FOR THE TANK INLET OF A MOTOR VEHICLE

CROSS-REFERENCE TO RELATED APPLICATIONS

This application is a national stage application under 35 U.S.C. 371 of PCT Application No. PCT/DE2016/100464 having an international filing date 6 Oct. 2016, which PCT application claimed the benefit of German Patent Application No. 202015105342 filed 8 Oct. 2015, the entire disclosure of each of which are hereby incorporated herein by reference.

FIELD

The invention relates to an inlet end piece for the tank inlet of a motor vehicle.

BACKGROUND

An inlet end piece of this type has, for example, a pipe inlet and a closure insert arranged in the upper area of the pipe inlet, for closing the pipe inlet in relation to the environment. The closure insert preferably has a filling opening for introducing the filler pipe of a gas pump nozzle and a sealing flap pivotable about a pivot axis, which in particular can be opened by pivoting counter to the force of a closing force that counteracts the opening movement by the filler pipe when the latter is being inserted. This closing force is preferably formed by a closure spring that is tensioned by opening the closure flap. In the closed state of the closure flap, the closing force holds the closure flap so as to bear on a detent which is formed in particular by a seal.

An inlet end piece of this type is known from DE 10 2010 036 970 A1. This herein is a so-called lid-free inlet end piece which has an upper protection mechanism against erroneous fueling and the lower sealing flap that is disposed at a spacing from said protection mechanism. These lid-free inlet end pieces have the advantage that they can prevent both an erroneous refueling of a diesel vehicle with gasoline, as well as conversely an erroneous refueling of a vehicle having a gasoline engine with diesel fuel. However, the applicability of the present invention is not limited to this special aspect or to a lid-free inlet end piece.

On account of the sealing flap in the case of the known inlet end piece being disposed so as to be spaced apart from the upper entry flap of the protection mechanism, the user either when pulling the gas pump nozzle out of the inlet end piece, or else by way of an insufficient introduction depth, can fill a minor quantity of fuel into the area between the sealing flap and the upper protection mechanism. Said fuel by way of a discharge line then runs out of this upper area.

SUMMARY

It is an object of the invention to improve the inlet end piece such that the user is able to identify whether the fuel that is introduced by him/her actually does still run through the sealing flap into the tank.

This object is achieved as claimed in the invention by an inlet end piece as claimed in claim 1.

In the case of one preferred design embodiment of the invention, the inlet end piece is configured in such a manner that the latter has at least one indicator means having an indicator area, said indicator means being held in a receptacle so as to move reciprocally from an inactive position to a signal position. In the case of a closed sealing flap, the indicator means is then located in the inactive position and is disposed in the receptacle in such a manner that the indicator area is not visible to the user. By sliding the filler pipe up to an insertion depth in which the sealing flap is at least partially opened, the indicator means is then forcibly displaced into the signal position in which the indicator area is then preferably clearly visible to the user.

By way of the design embodiment as claimed in the invention of the inlet end piece, it is now indicated to the user by way of the indicator means whether the lower sealing flap is opened and refueled fuel thus runs into the tank, or said fuel on account of the closed sealing flap remains in the space between the sealing flap and the upper closure mechanism. In general, the invention is always advantageously applicable when an inlet end piece in which fuel could accumulate is available above the sealing sealing flap.

In particular when a double-flap mechanism is used, the user could otherwise be convinced that the opening of the upper flap is sufficient in order for the motor vehicle to be refueled. Moreover, many motorists have a tendency to allow the fuel that after refueling remains in the hose of the gas pump to run into the tank. However, the gas pump nozzle herein is often already withdrawn such that the fuel runs only into the upper annular space above the lower sealing flap (closed in a sealing manner), but from there is discharged again, dripping from the tank system.

As claimed in the invention, the indicator means which when sliding the filler pipe of the gas pump nozzle in up to a required depth is forcibly transferred from the inactive position to the signal position is now provided. In principle, this can be performed in various ways. For example, this can take place by a component that forms said indicator means, said component being rotated or displaced either by sliding the filler pipe in or by the opening movement of the sealing flap being, wherein the indicator area becomes visible on account of the movement of the indicator means.

For example, the indicator means can thus protrude through a small viewing window, wherein said indicator means in the inactive position initially terminates so as to be substantially flush with the window, while said indicator means in the active signal position protrudes upward from the window. The protruding area then forms the indicator area. The latter can be identified by color, so as to make the function additionally visible to the user in an obvious manner.

An alternative design embodiment can, for example, be that the indicator means below the window is displaced laterally in relation to the window, such that the user can in each case see an area of the indicator means in another color through the window. This design embodiment will be described in more detail further below.

First, a preferred design embodiment of the invention in which the indicator means is formed by an indicator pin is described, said indicator pin being mounted so as to be displaceable substantially parallel with the pushing-in direction of the filler pipe in the closure insert of the inlet end piece. In the inactive position, the upper end of the indicator pin terminates so as to be flush with a passage window. With the exception of a thin encircling gap, the user in this case can initially thus barely identify the indicator pin.

The indicator pin, when pushing in the filler pipe, will first remain in its position, and will only be moved once the filler pipe reaches the area of the sealing flap. This preferably takes place only once the sealing flap has been opened by at least an opening angle which is sufficiently large so as to allow the fuel to run into the inlet.

In the case of one potential design embodiment, the indicator pin is attracted to the sealing flap by way of a magnet. This can be performed either in that the sealing flap is provided with a magnet, or is magnetic per se, or in that the magnet, or the magnetic area, respectively, is provided on the indicator pin. A counterpart, either in the form of another magnet of opposite polarity or in the form of a ferromagnetic area, that is attracted by the magnet is in this instance provided on the respective other component.

If the sealing flap is now opened by pivoting in a downward manner on account of the intrusion of the filler pipe into the inlet end piece, the magnet moves away from the magnetic counterpart. On account thereof, the attractive force is increasingly reduced. In the case of this design embodiment, a setting spring which urges the indicator pin upward to the signal position is simultaneously provided. The spring force of this setting spring is lower than the magnetic force in the case of a closed sealing flap.

The magnetic force is now continuously reduced on account of the opening of the sealing flap, until the spring force of the setting spring exceeds the magnetic force. This leads to the indicator pin being moved upward until the latter impacts on an upper detent and by way of its upper indicator area protrudes from the passage opening. In this case, the user can readily perceive the indicator area, in particular when the latter is marked by colors, or leaps from a colored surrounding. On account of the indicator pin with the magnetic counterpart thereof moving further away from the magnet at the moment at which the spring force exceeds the magnetic force, the effect is further amplified, and the indicator pin is moved abruptly into the signal position.

The opening angle which has to be achieved in order for the change in position of the indicator pin from the inactive position into the signal position to be triggered can be set by selecting a suitable spring rate. This means that the signal position is reached not already when the filler pipe of the gas pump nozzle comes close to the closure flap, but only once the closure flap has actually been opened by a suitable angle. This is advantageous in particular when the user in the reversed movement withdraws the filler pipe again. Here too, the indicator pin is already retracted when the sealing flap has not yet been completely closed. This leads to the user being able to be sure that the fuel which still exits from the filler pipe is also able to run into the tank whenever the indicator pin is in the signal position.

Of course, the indicator pin does not mandatorily have to be displaceable parallel with the pushing-in direction of the filler pipe. Only the fact that said indicator pin by way of an indicator area can jump to a position which can be perceived by the user is important. However, for space reasons, it will be preferable for the indicator pin to be disposed so as to be as parallel as possible with the pipe inlet. The indicator pin here in can be mounted both within the closure insert, as well as beside the closure insert, so as to be separately displaceable between the pipe inlet and the closure insert.

The indicator pin per se can have any shape possible, in particular be configured so as to be cylindrical or else having a rectangular cross-section, or also be composed of a combination of dissimilar shapes. Ultimately, a pin in the context of the function is any component which by way of the spatial displacement thereof is capable of rendering the indicator area optically visible to the user by displacement.

A further possibility for implementing the concept as claimed in the invention lies in that the indicator means is coupled to the movement of the sealing flap. This can be achieved, for example, in that the sealing flap that is pivotably mounted in the closure insert is extended in length beyond the pivot axis by way of an setting section. This setting section, when pivoted, is then moved in a direction counter to the sealing flap, that is to say that the setting section pivots upward when the sealing flap is pivoted downward. An indicator means that is mounted so as to be displaceable in this area can then interact with the setting section such that said indicator means is pushed upward by the sealing flap. To this end, said indicator means can be connected to the setting section either by way of a lever mechanism, or by way of a direct articulated connection.

The setting section can thus have the shape of a fork, for example, the pin-type indicator means protruding into the slot of said fork. The indicator means in this instance can have protrusions above and below the fork, said protrusions serving for transmitting force.

A further possibility for implementing the invention lies in that a separate lever protrudes into the displacement path of the filler pipe in the area of the closure flap, such that said lever is pivoted by the intruding filler pipe. The lever can have an angled area which in turn interacts with the indicator means, wherein the pivoting of the lever displaces the angled area upward. The indicator means that is coupled to said angled area is likewise displaced upward such that the indicator area can exit through the passage opening to the outside, so as to indicate the opening of the sealing flap to the user.

A further possibility, already mentioned above, lies in that the indicator area does not enter through the passage opening to the outside, but is visible through a viewing window and, for example, a lateral displacement of the indicator means indicates the opening state of the sealing flap to the user. The intruding filler pipe, or the sealing flap that pivots downward, can thus laterally displace an indicator means that is disposed in the pipe inlet, for example, wherein this indicator means is routed upward along the pipe inlet and at the top is angled by, for example, 90°. This angled area in the case of this design embodiment lies below the viewing window and in the inactive position by way of a red part-area is disposed below the viewing window, for example.

If the filler pipe is now inserted into the pipe inlet, said filler pipe at a certain intrusion depth, the opening of the sealing flap corresponding thereto, comes into lateral contact with the indicator means and laterally displaces the latter. On account thereof, the area of the indicator means that is routed upward is likewise laterally displaced, and the red area is displaced in favor of an adjacent area that is colored green, for example. The user can then identify the green part of the indicator means through the viewing window, said green part indicating the sufficient intrusion depth to the user.

In the case of a corresponding configuration of the gas station, in particular of the pump control of the gas pump and of the gas pump nozzle, the displacement of the indicator means can also be utilized for activating the pump. To this end, the gas pump nozzle has a lower push button, for example, which is activated by the projecting indicator area when the gas pump nozzle is inserted. The pump is only activated once the indicator area has impinged the indicator area with a switching pressure, so that it is ensured that the closure flap has been opened.

Finally, the movement of the indicator means can also trigger an acoustic or an optic signal, the latter being disposed so as to be remote from the inlet end piece. The indicator means can thus be utilized as a switching element which triggers said signal when the inactive and/or the signal position is reached. This can be performed as an alternative to the visualization of the indicator area, or as an addition to said position. An acoustic signal can be, for example, a brief activation of the horn of the motor vehicle, such as is known from alarm systems. An optical display can be the short flashing of the direction indicators. A control lamp in the interior can also continuously indicate the closed state of the sealing flap or else the open state which, with the exception of refueling, is caused by a fault. In this case, the function of the vehicle can also be closed down or restricted by way of an immobilizer.

The embodiments described above represent examples which implement the concept as claimed in the invention, without the scope of the present application being limited thereto. The dependent claims relate to advantageous design embodiments of the invention, wherein the individual features of the dependent claims are also considered to be the subject matter of the present invention in any combination, independently of the dependency references stated.

Further features and advantages of the invention are derived from the description hereunder of a preferred exemplary embodiment by means of the drawings.

DETAILED DESCRIPTION

Figure 1:
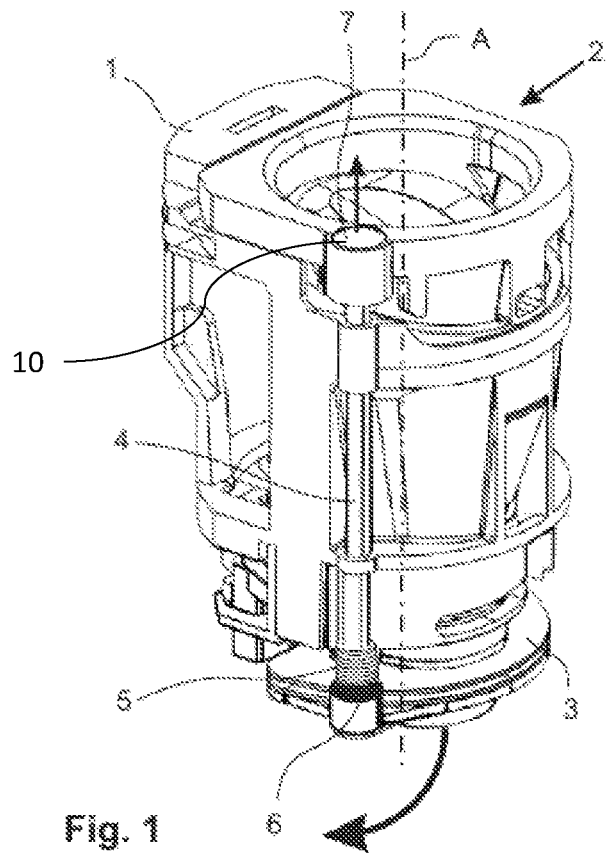
FIG. 1 shows a three-dimensional illustration of a closure insert of an inlet end piece as claimed in the invention.
Figure 2:
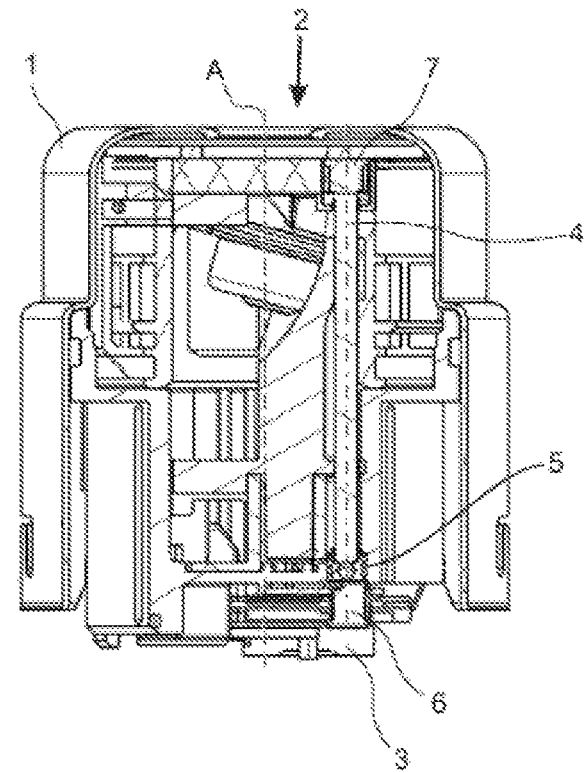
FIG. 2 shows the closure insert illustrated in FIG. 1 in a sectional view.

A preferred design embodiment of the invention is illustrated in FIG. 1. The external pipe inlet is not illustrated here, FIG. 1 for improved clarity of the substantial details showing only the closure insert 1. FIG. 2 shows the closure insert 1 in a sectional lateral view.

This closure insert 1 is inserted into the upper part of a pipe inlet for refueling the tank of a motor vehicle. The closure insert in the lower area has the actual sealing flap 3 which counter to the force of a restoring spring (not visible here) can be opened in the direction of the arrow by way of the filler pipe of a gas pump nozzle that is pushed in along the inlet axis A of the pipe inlet.

An upper flap, the function of the latter not being essential to the invention, is provided in the area of the filling opening 2. This upper flap is preferably to be opened only by the filler pipe of a gas pump nozzle for dispensing suitable fuel. This function, that is not essential to the present invention, is described in detail, for example, in DE 10 2010 036 970 A1, the content of which by way of this reference is explicitly intended to be incorporated in the present description.

The closure insert 1 in the front area has an indicator pin 4. The indicator pin 4 here at two locations in the area of which said indicator pin 4 is cylindrically configured, is mounted so as to be displaceable and parallel with the inlet axis A of the pipe inlet. A setting spring 5 which urges the indicator pin 4 upward is provided in the lower area. The upper end of the indicator pin 4 is configured as an indicator area 7 and in the inactive position shown received in a round receptacle in the upper face of the closure insert 1. From above, the user thus only sees the upper side of the indicator area 7.

Figure 3:
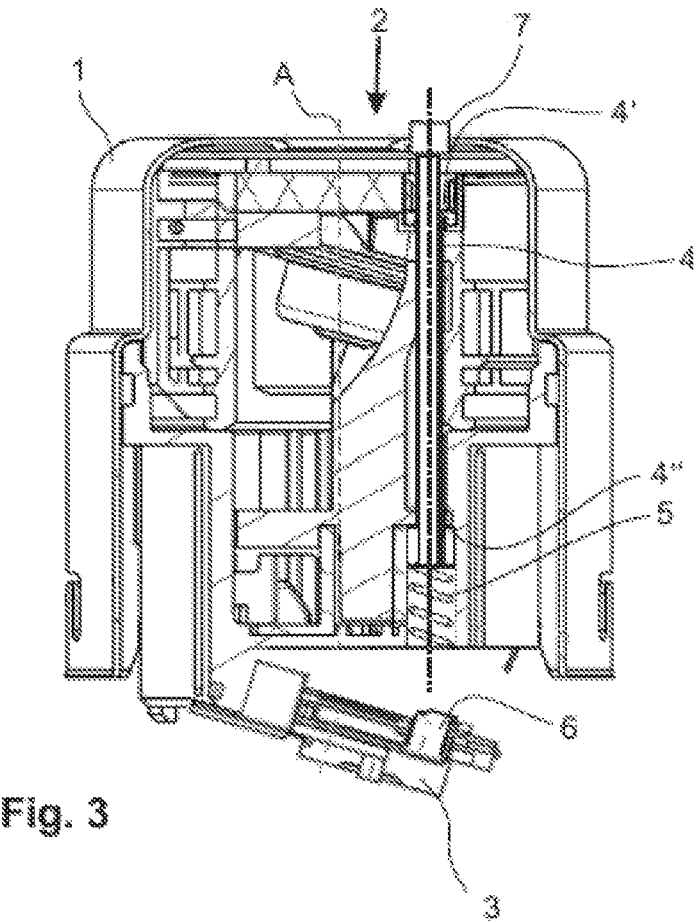
FIG. 3 shows the closure insert of FIG. 2 with the sealing flap in an open downward position.
Figure 4:
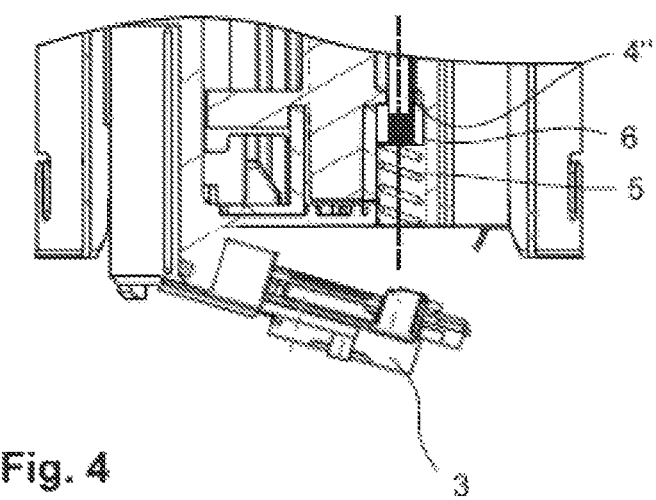
FIG. 4 shows a detail cross-sectional view of the sealing flap in the open downward position.
Figure 5:
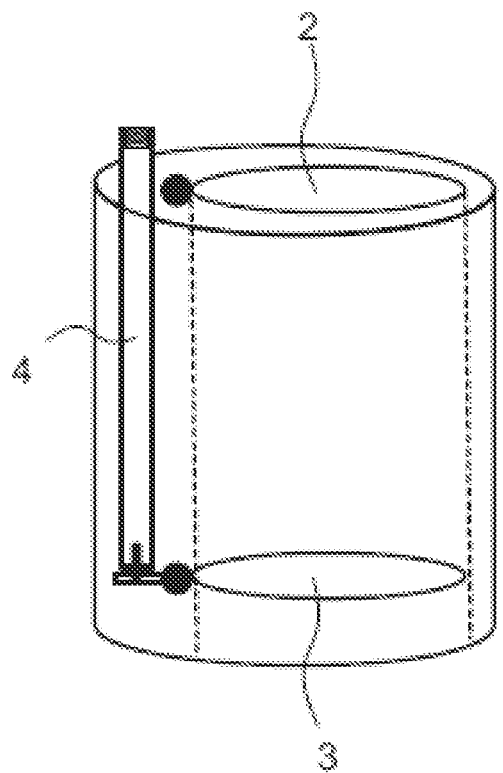
FIG. 5 is a schematic illustration of an alternative embodiment of a closure insert of an inlet end piece as claimed in the invention.
Figure 6:
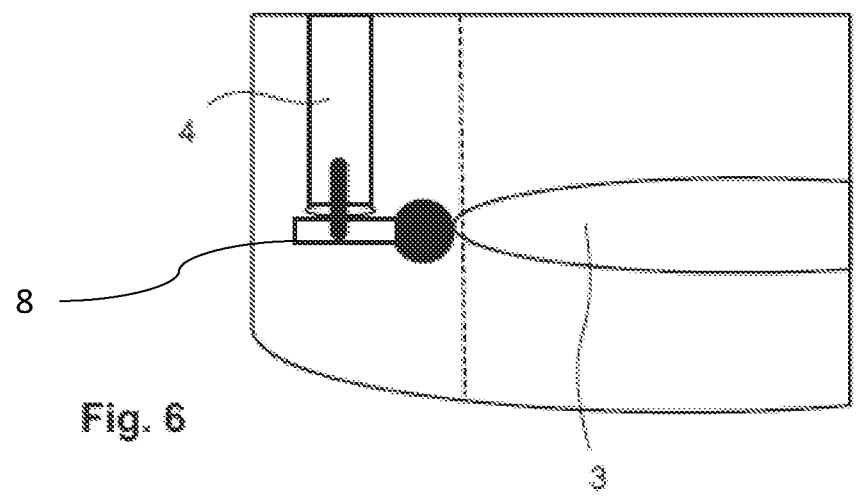
FIG. 6 is detail view of a setting section of the alternative embodiment of FIG. 5.

A magnet 6 is provided on the sealing flap 3. Said magnet 6 is disposed so as to be spaced apart to the pivot axis of the sealing flap 3 such that said magnet 6, conjointly with the sealing flap 3, is pivoted downward when a filler pipe of a gas pump nozzle intrudes. The lower end of the indicator pin 4 is configured in such a manner that said lower end interacts with the magnet 6 such that the magnet 6 is capable of attracting the indicator pin 4. Referring to FIG. 3, the sealing flap 3 is provided with a magnet 6, or is magnetic per se, or in that the magnet 6, or the magnetic area, respectively, is provided on the indicator pin 4 as shown in FIG. 4.

The indicator pin 4 in the exemplary embodiment shown is thickened in the upper area that forms the indicator area 7, and here is received by an annular receptacle 10 of the upper part of the closure insert 1. The annular receptacle 10 by way of a detent engages below said thickened area and thus forms a lower detent 4' such that the indicator pin 4 cannot be displaced further downward.

If the sealing flap 3 is now forced open downward in the direction of the arrow, the indicator pin 4 by virtue of the lower detent 4' cannot be drawn downward by the magnetic force. Instead, the magnet 6 is increasingly moved away from the magnetic area of the indicator pin 4, on account of which the attractive force of the magnet 6 is increasingly reduced.

The force of the setting spring 5 which attempts to push the indicator pin 4 upward, will now exceed the magnetic force at specific opening angle. The magnetic force is now continuously reduced on account of the opening of the sealing flap, until the spring force of the setting spring 5 exceeds the magnetic force. This leads to the indicator pin 4 being moved upward until the latter impacts on an upper detent 4" and by way of its upper indicator area protrudes from the passage opening. At this moment, the setting spring 5 pushes the indicator pin 4 upward such that the indicator area 7 protrudes from the receptacle and is identifiable to the user. The external shell face of the thickened upper area is preferably provided with a significant signal color such that the projection of the indicator area 7 from the receptacle is visually particularly obvious.

The design embodiment having the magnet 6 and the force of the setting spring 5 that is directed counter to the magnetic force, has the particular advantage that the indicator area 7 is not already moved upward in the case of the first movement of the sealing flap 3, but abruptly springs upward only once a particular opening angle has been reached, in the case of which, after an equilibrium between the magnetic force and the spring force has been passed, the spring force prevails. It is ensured on account thereof that the sealing flap 3 in the case of the indicator area 7 protruding from the receptacle is opened, and fuel is able to run into the tank through the open sealing flap 3.

It is thus excluded that the user by slowly withdrawing the filler pipe creates a state in which the indicator area 7 indeed still protrudes from the receptacle upward, but the sealing flap 3 is already closed, on the other hand. This would specifically be a critical area in which it could be attempted, for example, to allow gas that is located in the hose of the gas pump to still run into the tank.

If the user now withdraws the filler pipe from the closure insert along the inlet axis A, the magnet 6 moves closer to the indicator pin 4 again. When a specific closing angle is reached, the magnetic force will again exceed the spring force of the setting spring 5, and pull the indicator pin 4 downward again. This closing angle which is required for moving the indicator pin 4 to the inactive position will be somewhat smaller than the opening movement that is required for moving the indicator pin 4 in the opposite direction. The reason therefore is that the indicator pin 4 when closing is displaced by that path which has led said indicator pin 4 from the inactive position to the signal position. The magnet 6 has now to be additionally moved toward the closing position by said distance in order for the magnetic force that is required for overcoming the spring force to be reached.

The forces of the setting spring 5 and of the magnet 6 are preferably mutually adapted such that the indicator pin 4 when closing is already displaced to the inactive position prior to the closure flap 3 has been closed. This not only provides the user with the opportunity for the post-fueling by allowing the hose of the gas pump to run empty, as has already been described, but also makes available sufficient time to allow the quantity of fuel that is located in the intermediate space between the upper flap and the lower sealing flap 3 to run off.

A further possibility for implementing the concept as claimed in the invention lies in that the indicator means 4 is coupled to the movement of the sealing flap 3. This can be achieved, for example, in that the sealing flap 3 that is pivotably mounted in the closure insert is extended in length beyond the pivot axis by way of a setting section 8. This setting section 8, when pivoted, is then moved in a direction counter to the sealing flap 3, that is to say that the setting section 8 pivots upward when the sealing flap 3 is pivoted downward. An indicator means 4 that is mounted so as to be displaceable in this area can then interact with the setting section 8 such that said indicator means 4 is pushed upward by the sealing flap 3. To this end, said indicator means 4 can be connected to the setting section 8 either by way of a lever mechanism, or by way of a direct articulated connection.

The setting section 8 can thus have the shape of a fork, for example, the pin-type indicator means 4 protruding into the slot of said fork. The indicator means 4 in this instance can have protrusions above and below the fork, said protrusions serving for transmitting force.

The invention claimed is:

1. Inlet end piece for the tank inlet of a motor vehicle, comprising:
    a pipe inlet having a closure insert arranged in an upper area of the pipe inlet,
    wherein the closure insert includes a filler opening for a pump nozzle, an upper flap, and a lower sealing flap pivotable around a pivot axis, wherein the lower sealing flap is held by a closure force acting against the opening movement in the closed condition and can be opened by pushing in the pump nozzle,
    wherein the inlet end piece has at least one indicator means with an indicator area moveably mounted in such a way that the indicator means is located in an inactive position in which the indicator area is not visible for the user when the lower sealing flap is closed, and wherein the indicator means is displaced into a signal position in which the indicator area is visible for the user when the lower sealing flap is at least partially open.

2. The inlet end piece for the tank inlet of a motor vehicle according to claim 1, wherein the inlet end piece comprises a receptacle for the indicator means, wherein the indicator means is configured to move reciprocally in the receptacle from the inactive position to the signal position caused by pushing the filler pipe in as far as an insertion depth in which the lower sealing flap is at least partially open, so that the indicator area that was previously hidden from the user in the inactive position becomes visible, wherein the indicator area projects from an upper level of the closure insert with an upper end.

3. The inlet end piece for the tank inlet of a motor vehicle according to claim 2, wherein the inlet end piece has a setting spring displacing the indicator means when the sealing flap is open in such a way that the indicator area is visible for the user.

4. The inlet end piece for the tank inlet of a motor vehicle according to claim 2, wherein the sealing flap has a setting section that protrudes further than the pivot axis, wherein the indicator pin is displaceably mounted adjacent to a movement area of the setting section and cooperates with the setting section in such a way that the setting section can displace the indicator pin from the inactive position into the signal position.

5. The inlet end piece for the tank inlet of a motor vehicle according to claim 3, wherein the indicator means is an indicator pin with an at least sectionally rounded, oval or rectangular cross-section.

6. The inlet end piece for the tank inlet of a motor vehicle according to claim 5, wherein the indicator pin is mounted displaceably moveable along axis (A) of the pipe inlet between an upper detent and a lower detent in the receptacle, wherein the receptacle is arranged in or on the closure insert for receiving the indicator pin.

7. The inlet end piece for the tank inlet of a motor vehicle according to claim 6, wherein the indicator pin is held against the lower detent by the sealing flap when the sealing flap is closed.

8. The inlet end piece for the tank inlet of a motor vehicle according to claim 7, wherein a setting means is formed by the setting spring and a magnet pairing of at least one magnet and a counterpart attracted by the same, wherein the attracted counterpart is formed by the lower end of the indicator pin and the magnet pairing pulls the indicator pin in the direction of the sealing flap and the lower detent, and the setting spring is arranged and set up in such a way that it can apply a force to the indicator pin that opposes the force of the magnet and is sized in such a way that the force of the setting spring is overcome by the force of the magnet when the sealing flap closes, and the indicator pin is pulled so far down in the direction of the lower detent that the indicator area is no longer visible for the user.

9. The inlet end piece for the tank inlet of a motor vehicle according to claim 8, wherein the magnet is arranged on an area facing away from the pivot axis in the area of the non-facing edge of the sealing flap, and the lower end of the indicator pin is ferromagnetic.

10. The inlet end piece for the tank inlet of a motor vehicle according to claim 8, wherein the counterpart includes a ferromagnetic area formed on the lower end of the indicator pin by the metallic setting spring arranged at the lower end of the indicator pin.

11. The inlet end piece for the tank inlet of a motor vehicle according to claim 8, wherein the sealing flap includes a magnet and can be pivoted around a pivot axis, wherein the magnet is arranged on an area facing away from the pivot axis in the end area of the indicator pin, and the indicator pin can be moved along an axis arranged at a distance from the pivot axis of the sealing flap extending through the edge area of the sealing flap opposite the edge area of the closed sealing flap.

12. The inlet end piece for the tank inlet of a motor vehicle according to claim 11, wherein the indicator area is formed by the upper end of the displaceably mounted indicator pin, wherein the indicator pin is receivable into an annular receptacle in such a way that the indicator area is covered in the inactive position and is not visible.

\* \* \* \* \*